United States Patent
Pomerantz

(10) Patent No.: US 8,112,748 B2
(45) Date of Patent: Feb. 7, 2012

(54) METHOD FOR OPERATING SOFTWARE CONFIGURED FOR INTERNET ACCESS ON A REMOTE COMPUTER

(75) Inventor: Ori Pomerantz, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1923 days.

(21) Appl. No.: 11/218,011

(22) Filed: Sep. 1, 2005

(65) Prior Publication Data

US 2007/0050766 A1    Mar. 1, 2007

(51) Int. Cl.
  *G06F 9/455* (2006.01)
  *G06F 15/16* (2006.01)
  *G06F 3/00* (2006.01)

(52) U.S. Cl. .............................. 718/1; 709/217; 715/740

(58) Field of Classification Search ...... 718/1; 715/854; 709/224, 202
See application file for complete search history.

(56) References Cited

U.S. PATENT DOCUMENTS

| | | | |
|---|---|---|---|
| 6,476,833 B1 * | 11/2002 | Moshfeghi | 715/854 |
| 6,799,195 B1 * | 9/2004 | Thibault et al. | 709/203 |
| 6,842,777 B1 * | 1/2005 | Tuli | 709/217 |
| 6,874,084 B1 | 3/2005 | Dobner et al. | |
| 6,950,932 B1 | 9/2005 | Lavian et al. | |
| 7,111,245 B2 * | 9/2006 | Brockway | 715/764 |
| 7,111,303 B2 * | 9/2006 | Macchiano et al. | 719/313 |
| 7,246,174 B2 * | 7/2007 | Sciandra et al. | 709/244 |
| 7,257,614 B2 * | 8/2007 | Philyaw et al. | 709/202 |
| 7,526,762 B1 * | 4/2009 | Astala et al. | 717/171 |
| 7,552,213 B2 * | 6/2009 | De Oliveira et al. | 709/224 |
| 7,613,659 B1 * | 11/2009 | Hoffman et al. | 705/44 |
| 7,698,360 B2 * | 4/2010 | Rowley et al. | 709/203 |
| 2002/0129281 A1 * | 9/2002 | Hatfalvi et al. | 713/201 |
| 2002/0143861 A1 * | 10/2002 | Greene et al. | 709/203 |
| 2003/0196114 A1 | 10/2003 | Brew et al. | |
| 2005/0021668 A1 | 1/2005 | Beesley et al. | |
| 2005/0193396 A1 * | 9/2005 | Stafford-Fraser et al. | 719/328 |

FOREIGN PATENT DOCUMENTS

CN    1348647 A1    5/2002

OTHER PUBLICATIONS

Java Security Extensions for a Java Server in a Hostile Environment, David M. Wheeler, et al., Intel Corporation.
An Evaluation of Java Application Containers According to Security Requirements, Almut Herzog, et al., Dept. of Computer and Information Science, Linkoping University, Sweden.

* cited by examiner

*Primary Examiner* — Meng An
*Assistant Examiner* — Tammy Lee
(74) *Attorney, Agent, or Firm* — Yee & Associates, P.C.; Jeffrey S. LaBaw

(57) ABSTRACT

A method of operating software configured for Internet access on a remote computer includes opening a virtual machine on a remote computer from a user computer and sending user preferences from the user computer to the virtual machine. The method includes sending a request to operate the software configured for Internet access, and receiving user preferences from the virtual machine upon shutdown. A method of operating software configured for Internet access remote from a user computer includes opening a virtual machine on a remote computer and receiving user preferences at the virtual machine from the user computer. The method further includes receiving a request from the user computer at the remote computer and requesting at least one web page from the virtual machine and receiving a close command at the virtual machine from the user computer and sending the user preferences to the user computer in response to the shutdown.

19 Claims, 10 Drawing Sheets

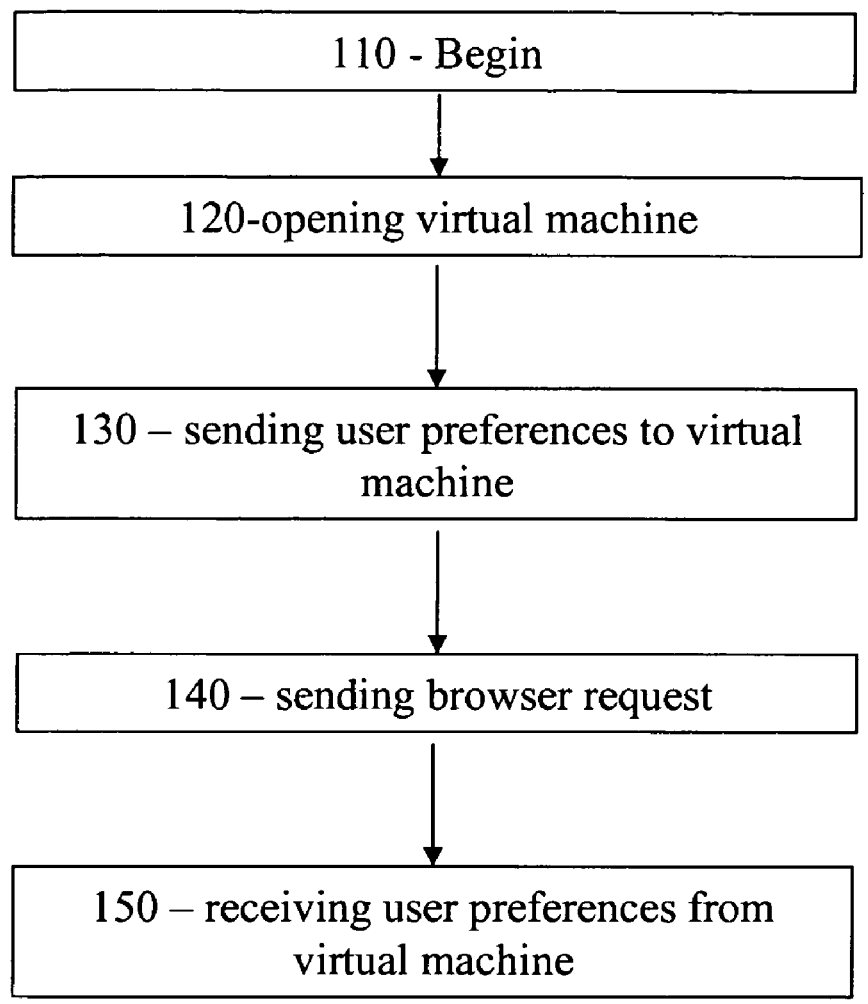

FIG. 2B      250
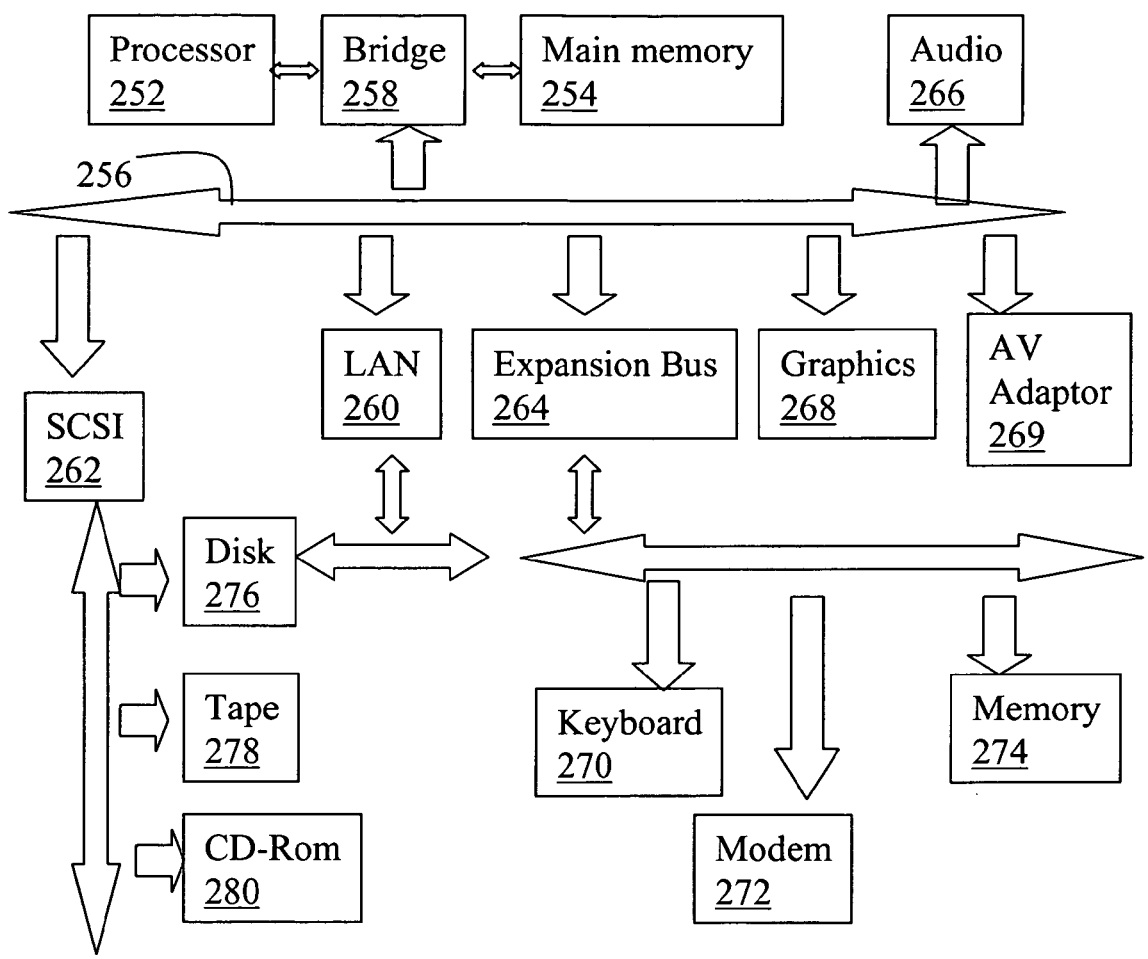

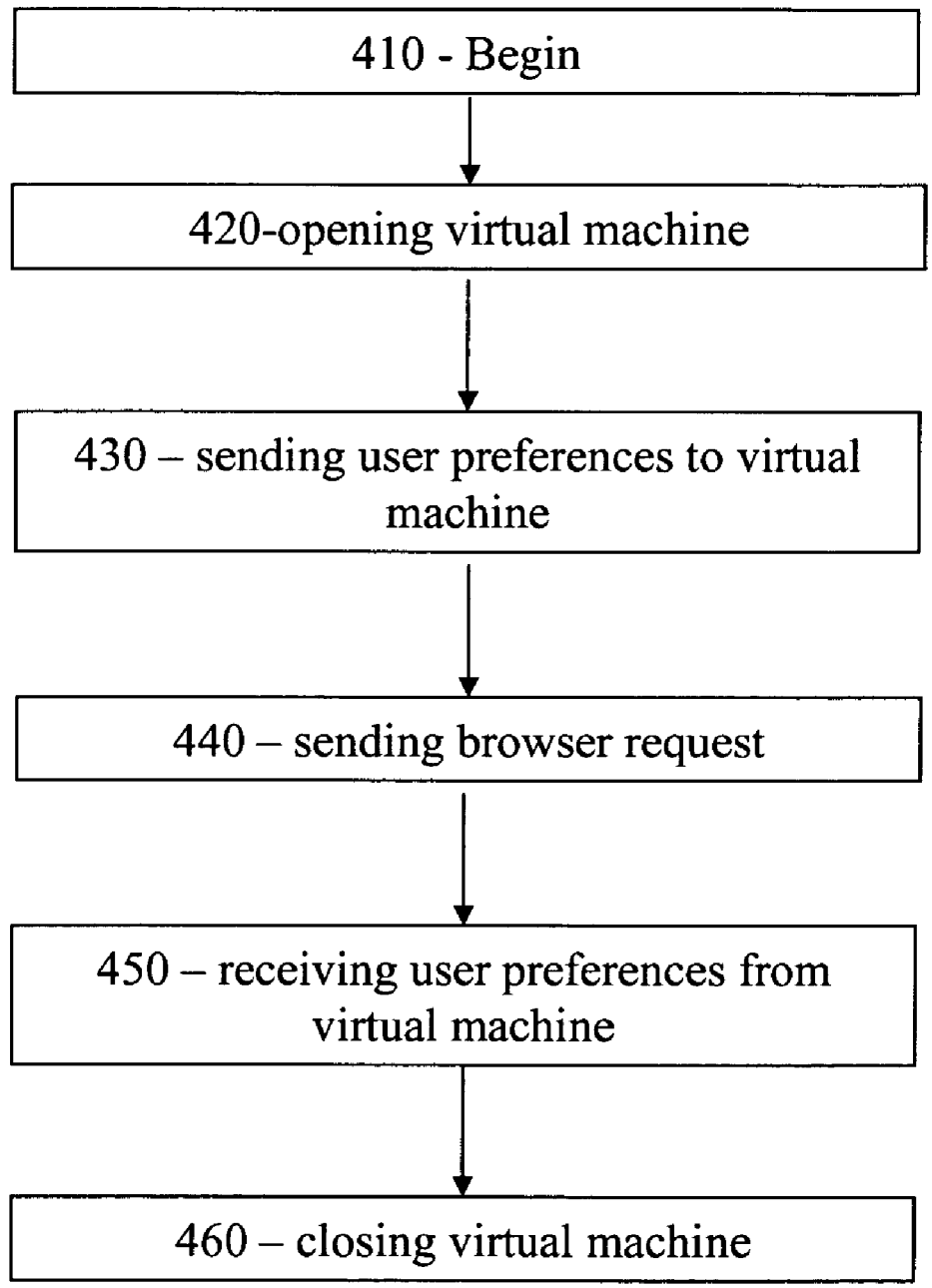

710 – determining whether operation of browser has modified user preferences

810 - Begin

820 - opening virtual machine

830 – copying a clean disk image

1000

METHOD FOR OPERATING SOFTWARE CONFIGURED FOR INTERNET ACCESS ON A REMOTE COMPUTER

FIELD OF INVENTION

The present invention generally relates to operating software configured for Internet access. More specifically, the invention relates to operating software configured for Internet access on a remote computer.

BACKGROUND OF THE INVENTION

Internet software configured for Internet access is notoriously insecure, and it is a challenge to the industry to increase security. While in theory it is possible to simply filter incoming traffic to ensure security, such a goal in practice leads to a Sisyphean arms race. In this application, when capitalized, the term "Internet" refers to any collection of networks and gateways that use the TCP/IP suite of protocols.

Some prior art attempts to increase security have run internet software configured for Internet access remotely to reduce the incidence of any damage to a user computer, and centralize any damage to a server that is more readily cured by administrators. Such attempts fail to maximize user satisfaction however, as users enjoy customizing their web browsing experience. Additionally, prior art attempts have required partitions to a user workstation or have undesirably limited the number of software configured for Internet access running on a server.

A virtual machine is a virtual computer component that resides only in memory. An exemplary virtual machine, the Java Virtual Machine ("JVM") allows Java® programs to be executed on different platforms as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format. The compiled code is executable on many processors, given the presence of the Java run-time environment. The Java compiler generates bytecode instructions that are non-specific to particular computer architectures. A bytecode is a machine independent code generated by the Java compiler and executed by a Java interpreter. A Java interpreter is a module in the JVM that alternatively decodes and executes a bytecode or bytecodes. These bytecode instructions are designed to be easy to interpret on any machine and easily translated on-the-fly into native machine code.

It is therefore a challenge to develop a method to increase browsing security to overcome these, and other, disadvantages.

SUMMARY OF THE INVENTION

A method of operating software configured for Internet access on a remote computer includes opening a virtual machine on a remote computer from a user computer and sending user preferences from the user computer to the virtual machine. The method further includes sending a request to operate the software configured for Internet access, and receiving user preferences from the virtual machine upon shutdown.

A method of operating software configured for Internet access remote from a user computer includes opening a virtual machine on a remote computer and receiving user preferences at the virtual machine from the user computer. The method further includes receiving a request from the user computer at the remote computer and requesting at least one web page from the virtual machine. Additionally, the method includes receiving a close command at the virtual machine from the user computer and sending the user preferences to the user computer in response to the shutdown.

Another embodiment of the invention provides a system for operating software configured for Internet access on a remote computer including means for opening a virtual machine on a remote computer from a user computer and means for sending user preferences from the user computer to the virtual machine. The system further includes means for sending a request to operate the software configured for Internet access, and means for receiving user preferences from the virtual machine upon shutdown.

The foregoing embodiment and other embodiments, objects, and aspects as well as features and advantages of the present invention will become further apparent from the following detailed description of various embodiments of the present invention. The detailed description and drawings are merely illustrative of the present invention, rather than limiting the scope of the present invention being defined by the appended claims and equivalents thereof.

BRIEF DESCRIPTION OF THE DRAWINGS

FIG. 1 illustrates one embodiment of a method for operating software configured for Internet access on a remote computer, in accordance with one aspect of the invention;

FIG. 2B illustrates one embodiment of a computer for use in accordance with one aspect of the invention;

FIG. 3A illustrates an embodiment of a method for sending user preferences from a virtual machine to a user computer, in accordance with one aspect of the invention;

FIG. 4 illustrates another embodiment of a method for operating software configured for Internet access on a remote computer, in accordance with one aspect of the invention;

FIG. 7 illustrates an embodiment of a method for sending user preferences from a virtual machine to a user computer, in accordance with one aspect of the invention;

FIG. 8 illustrates an embodiment of a method for opening a virtual machine in accordance with another aspect of the invention;

DETAILED DESCRIPTION OF THE PRESENT INVENTION

Figure 2A:
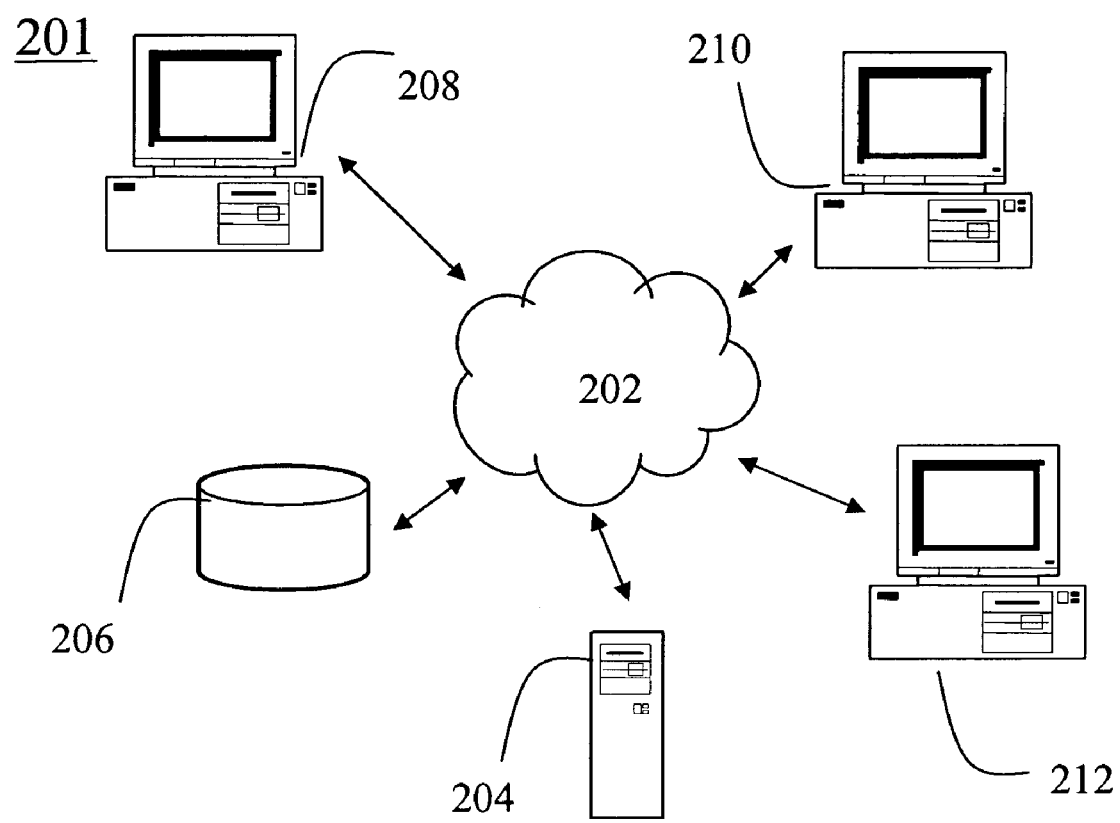
FIG. 2A illustrates one embodiment of a network system for use in accordance with one aspect of the invention.

FIG. 1 illustrates one embodiment of a method 100 for operating software configured for Internet access on a remote computer in accordance with one aspect of the invention. Method 100 begins at step 110. Any of the inventive methods disclosed herein may be executed in any appropriate order, and the order in which the methods are described is meant to be illustrative and exemplary only. The software configured for Internet access can be any software, such as a browser, email application, game client, instant messaging program, or other such similar software.

Method 100 sends a request to open a virtual machine to a remote computer, the remote computer remote from a user computer at step 120. A "computer" as described herein is any computer configured to execute a sequence of commands to obtain a result. The computer may run any appropriate operating system, including but not limited to a Windows-based operating system, UNIX, LINUX, AIX, Macintosh OS, SunOS, PalmOS, or the like. The computer may be any personal computer, such as an IBM or IBM-compatible PC, Macintosh computer, personal digital assistant, game console, server station, workstation, or any such similar computer device or system. In one embodiment, the remote computer is implemented as one of clients 208, 210, 212 described with reference to FIG. 2A below, and the user computer is implemented as another of clients 208, 210, 212, but not the same client as the remote computer.

The user computer is configured to display the results of execution of a browser or other such software configured for Internet access on any display device, such as a monitor, as appropriate. For example, the user computer can be configured to operate with a Virtual Network Computing ("VNC") protocol, and the remote computer configured to operate as a VNC server, such that the user has remote access to graphical user interfaces. As known to those of ordinary skill in the art, a VNC protocol allows a server to remotely update a framebuffer for a viewer. VNC protocols can be configured to operate on any computing framework, such as desktop, laptop, personal digital assistants, game console or the like.

A virtual machine is a construct created by an application, such as the Java Virtual Machine, VMWare, VMSWare, or the like, that creates a so-called 'sandbox' that intercepts or receives requests from an application and executes the requests in a fashion to isolate the user's application and computer system from any potentially harmful, adverse, or undesired effects of the request. The sandbox can be, but is not necessarily, an actual physical address space. For example, the Java language provides for sandboxes as a set of security processes preventing untrusted code from performing certain operations on the machine operating under the Java language.

The command to open the virtual machine is issued to a remote computer from a user computer. The user computer and remote computer communicate electronically using a network connection. The network connection can operate using any appropriate network protocols, including but not limited to, X11 and VNC. Use of a protocol such as X11 or VNC can result in the illusion that an application running on the virtual machine appears to be running on the user computer.

In one embodiment, the virtual machine is opened in response to a direct request from a user, in the form of an explicit request for opening a virtual machine. In another embodiment, the virtual machine is opened automatically upon opening software configured for Internet access at the user computer. In embodiments where the virtual machine is opened automatically, a user need not be notified of the opening of the virtual machine.

Having opened the virtual machine, user preferences are sent from the user computer to the virtual machine at step 130. In one embodiment, sending the user preferences comprises copying at least one file containing data reflecting the user preferences from the user computer to the virtual machine. In one embodiment, the user preferences are sent from the user computer to a third machine, such as a LDAP (Lightweight Directory Access Protocol) directory. In one embodiment, featuring a third machine, the user preferences are sent to another implementation of a virtual machine operating on a third device.

User preferences are defined as any parameter associated with a particular user through user interaction with the software configured for Internet access including user configured parameters. In one embodiment, the user preference is a bookmark list. In one embodiment, the user preference is management and/or storage of cookies associated with a user's previous browsing history. For example, a user can configure a browser to accept or reject cookies associated with Internet browsing activities in whole or in part. In another embodiment, the user preference is a user configuration setting. In one embodiment, the user preference includes at least one of a bookmark list, cookies associated with a user's previous browsing and a user configuration setting.

A request is sent from the user computer to the virtual machine during step 140. In one embodiment, the request is issued after executing software configured for Internet access program using the virtual machine. As used herein, a "request" is any request for content and/or services maintained on a computer other than the user's computer that is generated by the software configured for Internet access. The software configured for Internet access can be any program configured to access the Internet, such as, but not limited to, Internet Explorer, Netscape, Firefox, Mozilla, Safari, Outlook, Outlook Express, or other such program. In one embodiment, the request comprises a Uniform Resource Locator (URL) associated with desired content or information.

In one embodiment, requests are transmitted between the user computer and the virtual machine with a file transfer protocol configured with a customized agent to allow file downloads from a URL. In one embodiment, file downloads are limited based on a configurable parameter, such as an anti-virus program. In another embodiment, downloads are limited to explicitly allowed downloads. Permission for downloads can be secured, for example, from a user, or a system administrator. In another example, permission for a download is premised on the file to be downloaded passing a 'security' test that can include screening the download for viruses, 'spyware' activity or comparing the file name to a list of either permissible or impermissible downloads.

After sending the user preferences from the user computer to the virtual machine, user preferences are received from the virtual machine at the user computer. In one embodiment, the user preferences are received in response to a shutdown command. The shutdown command may result from a user choice to terminate software configured for Internet access operation, or the shutdown command may result from technical issues, such as an involuntary shutdown. An involuntary shutdown results from, for example, a system or software error, resolution of which necessitates termination of the software configured for Internet access application execution.

FIG. 2A illustrates an exemplary network system 201. Network system 201 is illustrative only, and is not an architectural limitation for the practice of this invention. Network system 201 is a network of computers in which the present invention may be implemented. Network system 201 includes network 202, which is the medium used to provide communications links between various devices and computers connected together within distributed network system 201. Network 202 may include permanent connections, such as wire or fiber optic cables, or temporary connections made through telephone connections. In other embodiments, network 202 includes wireless connections using any appropriate wireless communications protocol including short range wireless protocols such as a protocol pursuant to FCC Part 15, including 802.11, Bluetooth or the like, or a long range wireless protocol such as a satellite or cellular protocol.

In FIG. 2A, a server 204 is connected to network 202 along with storage unit 206. In addition, clients 208, 210, and 212 also are connected to a network 202. These clients 208, 210, and 212 may be, for example, personal computers or network computers. For purposes of this application, a network computer is any computer, coupled to a network, which receives a program or other application from another computer coupled to the network. In the depicted example, server 204 provides data, such as boot files, operating system images, and applications to clients 208-212. Clients 208, 210, and 212 are clients to server 204. Network system 201 may include additional servers, clients, and other devices not shown. In the depicted example, network system 201 is the Internet with network 202 representing a worldwide collection of networks and gateways that use the TCP/IP suite of protocols to communicate with one another. Network system 201 also may be implemented as a number of different types of networks, such as for example, an intranet or a local area network.

FIG. 2B illustrates one embodiment of a computer client 250 for use in accordance with one aspect of the invention. Computer system 250 is an example of a client computer, such as clients 208, 210, and 212. Computer system 250 employs a peripheral component interconnect (PCI) local bus architecture. Although the depicted example employs a PCI bus, other bus architectures such as Micro Channel and ISA may be used. PCI bridge 258 connects processor 252 and main memory 254 to PCI local bus 256. PCI bridge 258 also may include an integrated memory controller and cache memory for processor 252. Additional connections to PCI local bus 256 may be made through direct component interconnection or through add-in boards. In the depicted example, local area network (LAN) adapter 260, SCSI host bus adapter 262, and expansion bus interface 264 are connected to PCI local bus 256 by direct component connection. In contrast, audio adapter 266, graphics adapter 268, and audio/video adapter (A/V) 269 are connected to PCI local bus 256 by add-in boards inserted into expansion slots. Expansion bus interface 264 connects a keyboard and mouse adapter 270, modem 272, and additional memory 274 to bus 256. SCSI host bus adapter 262 provides a connection for hard disk drive 276, tape drive 278, and CD-ROM 280 in the depicted example. In one embodiment, the PCI local bus implementation support three or four PCI expansion slots or add-in connectors, although any number of PCI expansion slots or add-in connectors can be used to practice the invention.

An operating system runs on processor 252 to coordinate and provide control of various components within computer system 250. The operating system may be any appropriate available operating system such as Windows, Macintosh, UNIX, LINUX, or OS/2, which is available from International Business Machines Corporation. "OS/2" is a trademark of International Business Machines Corporation. Instructions for the operating system, an object-oriented operating system, and applications or programs are located on storage devices, such as hard disk drive 276 and may be loaded into main memory 254 for execution by processor 252.

Those of ordinary skill in the art will appreciate that the hardware in FIG. 2B may vary depending on the implementation. For example, other peripheral devices, such as optical disk drives and the like may be used in addition to or in place of the hardware depicted in FIG. 2B. FIG. 2B does not illustrate any architectural limitations with respect to the present invention, and rather merely discloses an exemplary system that could be used to practice the invention. For example, the processes of the present invention may be applied to multi-processor data processing system.

FIG. 3A illustrates one embodiment of a method 200 for receiving user preferences at the user computer from the virtual machine, as in step 150. Method 200 begins at 210 by determining whether operation of the software configured for Internet access at the virtual machine has modified at least one of the sent user preferences. For example, operation of the software configured for Internet access results in deposition of cookies on the machine that is accessing many web pages—in this case the machine accessing a web page is the virtual machine rather than the user computer. Based on the determination of at least one modified user preference, the user preferences are received at the user computer, as in step 150. The user preferences may be received as a result of a determination made by the user computer after a comparison between the user preferences stored on the user computer and the user preferences on the virtual machine. Alternatively, the user preferences may be received as a result of a determination made by the virtual machine by comparing at least a first and second version of user preferences on the virtual machine. Additionally, the determination of changed user preferences is, in one embodiment, made in response to software configured for Internet access shutdown. In another embodiment, the determination iterates on a predetermined basis to maintain user preferences on the user computer and virtual machine substantially contemporaneously. Such an embodiment can minimize lost data resulting from hardware or software malfunction.

Figure 3B:
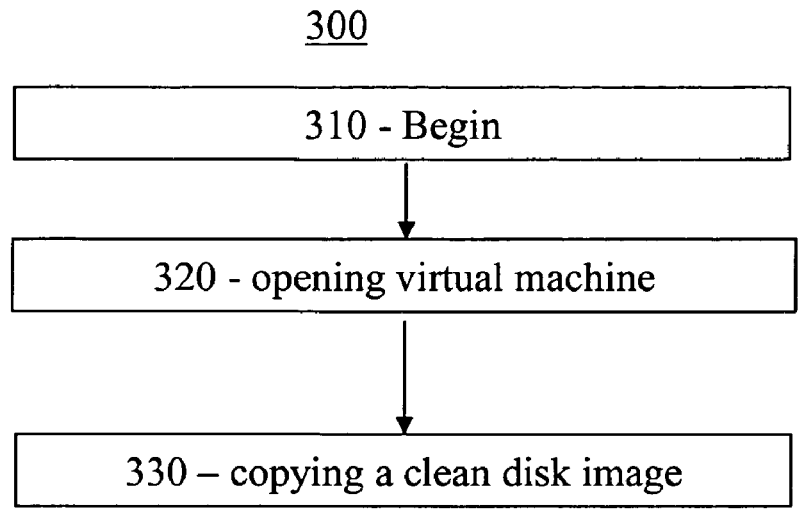
FIG. 3B illustrates an embodiment of a method for opening a virtual machine, in accordance with one aspect of the invention.

FIG. 3B illustrates one embodiment of a method 300 for opening a virtual machine, in accordance with one embodiment of the invention. Method 300 begins at 310, and at step 320, opens a virtual machine on a remote computer from a user computer. In one embodiment, step 320 is implemented as in step 120.

A clean disk image is copied, based on the opening of the virtual machine, at step 330. The clean disk image is copied to the remote computer to operate as a base for virtual machine operation. Clean disk images and their use and creation as supporting operation of a virtual machine are known in the art. In one embodiment, the clean disk image is a VMware disk image. Depending on the design of the virtual machine software, the clean disk image can be copied either prior to opening the virtual machine, during the opening process, or after the virtual machine has been opened.

FIG. 4 illustrates a method 400 for operating software configured for Internet access on a remote computer in accordance with another embodiment of the invention. Method 400 begins at 410, and opens a virtual machine on the remote computer at step 420. In one embodiment, step 420 is implemented as in step 120.

Method 400 sends user preferences from the user computer to the remote computer at step 430 and sends the request from the user computer to the remote computer at step 440. In one embodiment, step 430 is implemented as in step 130. In one embodiment, step 440 is implemented as in step 140. User preferences are sent from the virtual machine to the user computer at step 450. In one embodiment, step 450 is implemented as in step 150.

Figure 5:
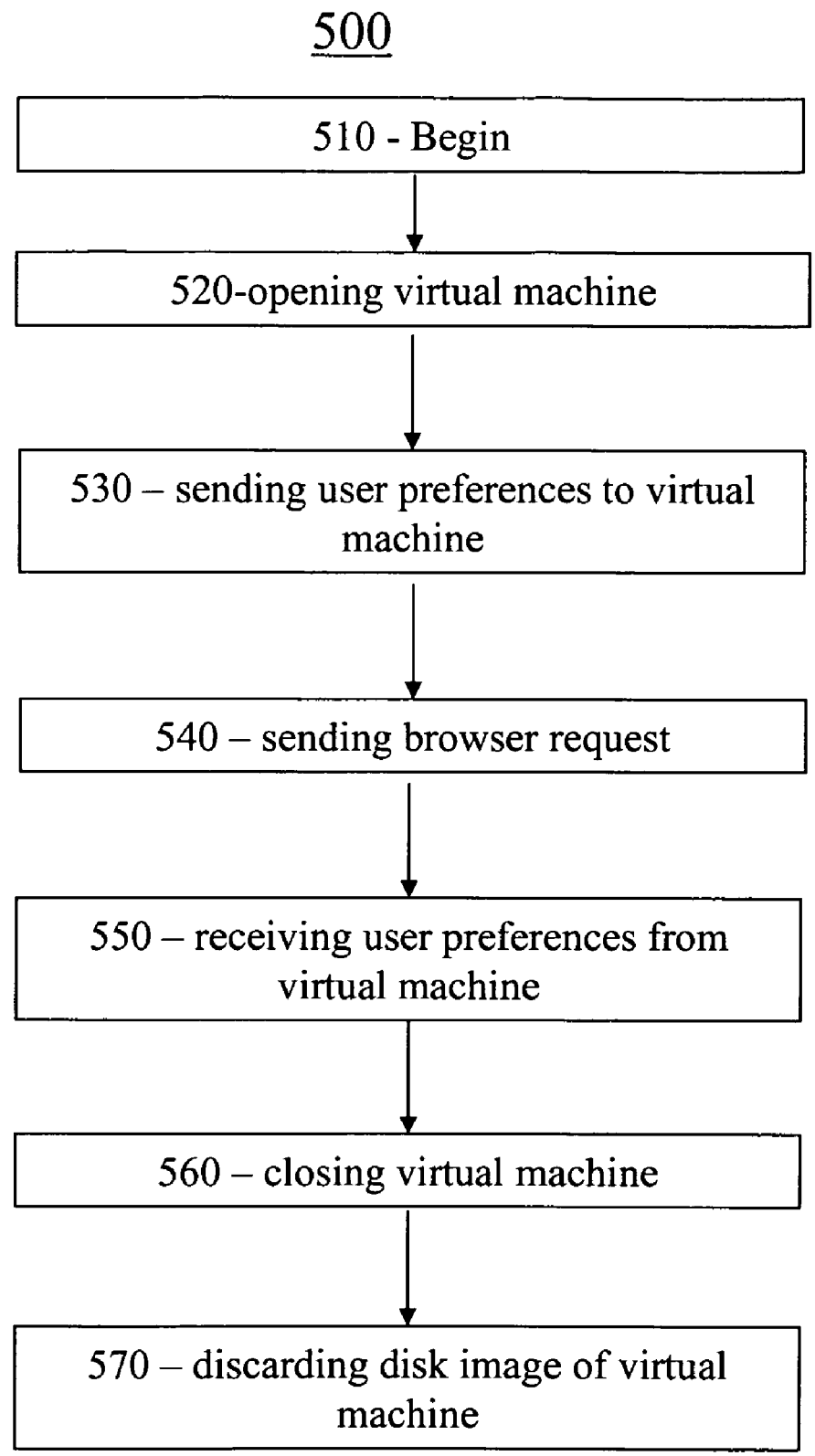
FIG. 5 illustrates another embodiment of a method for operating software configured for Internet access on a remote computer, in accordance with one aspect of the invention.

The virtual machine closes at step 460. Closing the virtual machine is based on software configured for Internet access shutdown. The shutdown can result from either a user request to close the application, or in one embodiment, software or hardware malfunction, requiring termination of the software configured for Internet access application thread. FIG. 5 illustrates a method for operating software configured for Internet access on a remote computer featuring one embodiment of a method for closing the virtual machine.

FIG. 5 illustrates a method 500 for operating software configured for Internet access on a remote computer, in accordance with one aspect of the invention. Method 500 begins at 510, and opens a virtual machine on the remote computer at step 520. In one embodiment, step 520 is implemented as in step 120.

Method 500 sends user preferences from the user computer to the remote computer at step 530 and sends the request from the user computer to the remote computer at step 540. In one embodiment, step 530 is implemented as in step 130. In one embodiment, step 540 is implemented as in step 140. User preferences are sent from the virtual machine to the user computer at step 550. In one embodiment, step 550 is implemented as in step 150. The virtual machine closes at step 560. Closing the virtual machine is based on software configured for Internet access shutdown, and in one embodiment step 560 is implemented as in step 460.

The disk image of the virtual machine is discarded at step 570. Discarding the disk image can include destroying the files that operated as the virtual machine, overwriting the disk regions that stored the virtual machine with new data, or removing reference to the files that operated as the virtual machine with the filesystem of the remote and/or user computers. Discarding the disk image of the virtual machine will effectively limit any adverse or undesirable effects of the requests from affecting the user computer and/or the remote computer.

Figure 6:
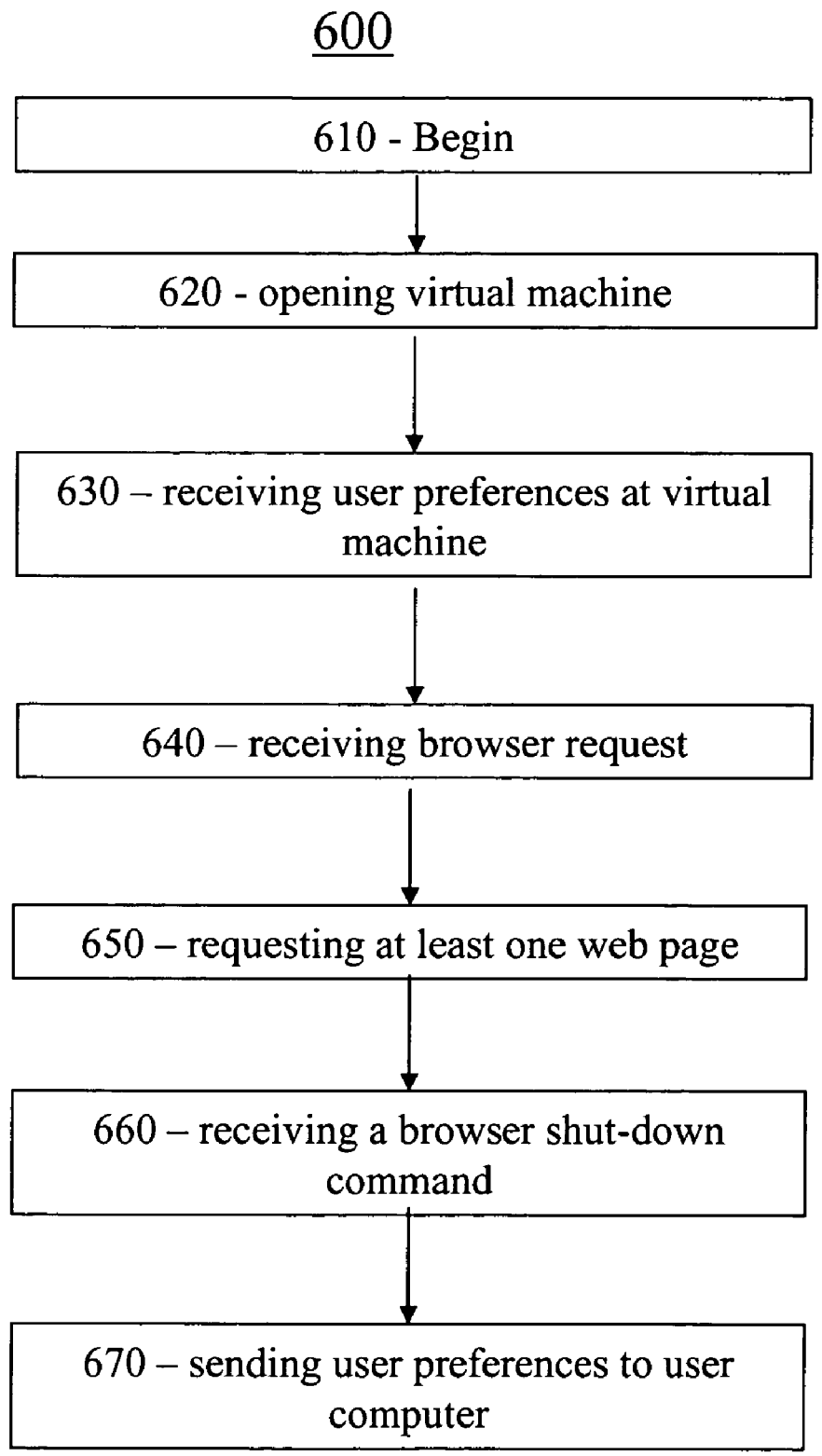
FIG. 6 illustrates another embodiment of a method for operating software configured for Internet access remote from a user computer, in accordance with one aspect of the invention.

FIG. 6 illustrates one embodiment of a method 600 for operating software configured for Internet access remote from a user computer, in accordance with one aspect of the invention. Method 600 begins at 610.

A virtual machine is opened on a remote computer from a user computer at step 620. FIG. 8 illustrates one embodiment of a method 800 for opening a virtual machine on a remote computer in accordance with one embodiment of the invention. Method 800 begins at step 810, and continues at step 820 with opening the virtual machine. At step 830, a clean disk image is copied to the remote computer. In one embodiment, method 800 is implemented as in method 300.

In method 600, user preferences are received at the virtual machine at step 630. In one embodiment, receiving the user preferences comprises copying at least one file containing data reflecting the user preferences from the user computer to the virtual machine. As with step 130, user preferences are defined as any parameter that can be user configured. In one embodiment, the user preference is a bookmark list. In one embodiment, the user preference is cookies associated with a user's previous browsing history. In another embodiment, the user preference is a user configuration setting. In one embodiment, the user preference includes at least one of a bookmark list, cookies associated with a user's previous browsing and a user configuration setting.

A request is received at the virtual machine during step 640. The request is any request for information associated with a URL, or software configured for Internet access request can be as defined in step 140.

At least one web page is requested at step 650. A web page is defined as any information obtainable with a request directed to a particular URL. Depending on the particular URL, requesting the web page can result in a modification of user preferences, as cookies are deposited on the virtual machine, or a user desires to add the URL to their bookmarks, for example.

A software configured for Internet access shutdown command is received at the virtual machine during step 660. The software configured for Internet access shutdown command is any command that results in the termination of the software configured for Internet access application thread at the virtual machine. For example, the software configured for Internet access shutdown command can result from a user action, software malfunction, or hardware malfunction. Alternatively, the software configured for Internet access shutdown command can result from an administrator command.

Based on the software configured for Internet access shutdown command, the virtual machine sends the user preferences to the user computer at step 670. FIG. 7 illustrates one embodiment of a method 700 for sending user preferences to the user computer, in accordance with one aspect of the invention. Method 700 begins at step 710 by determining whether operation of the software configured for Internet access has modified any of the user preferences. In one embodiment, method 700 is implemented as in method 200.

Figure 9:
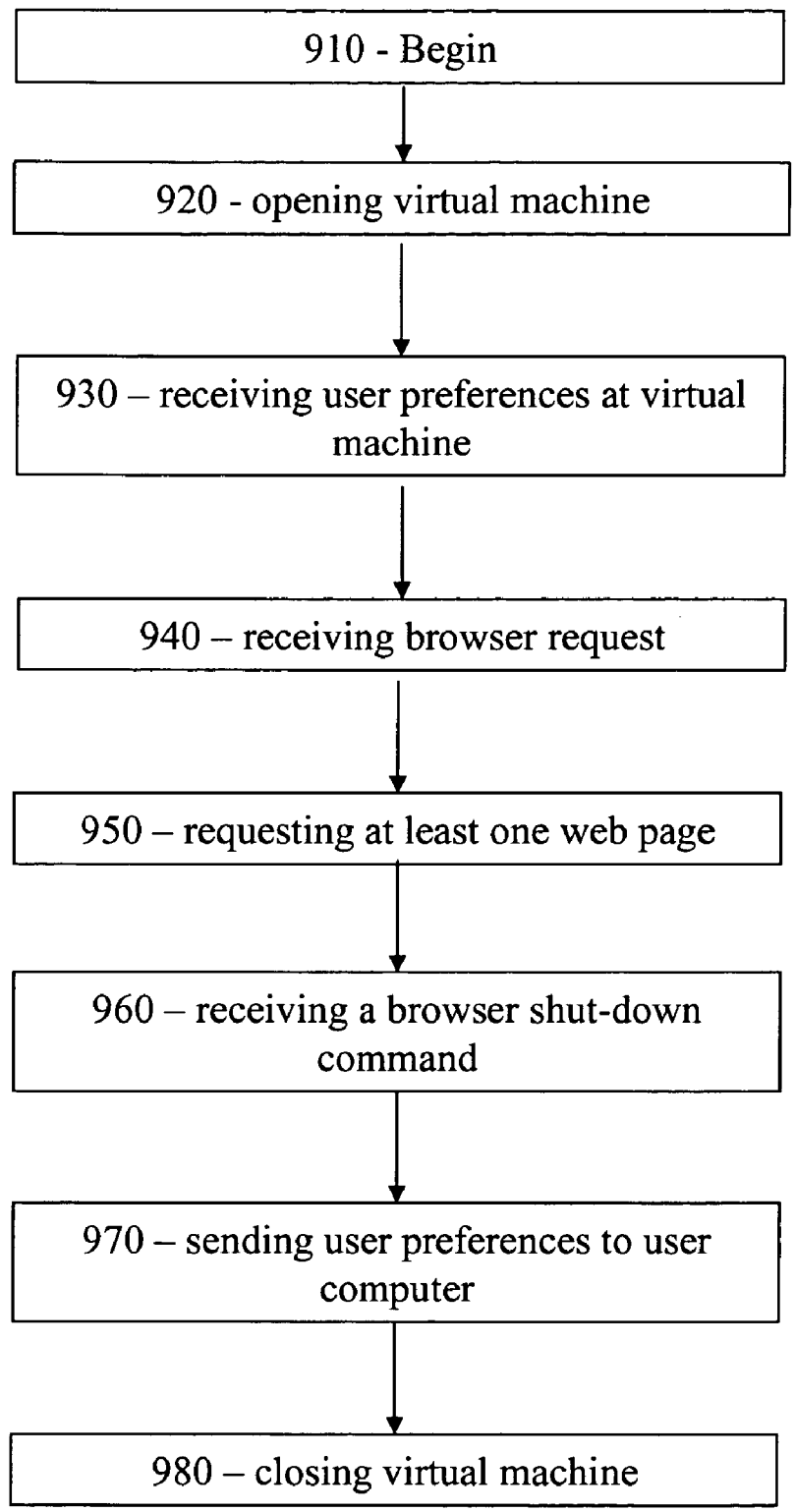
FIG. 9 illustrates another embodiment of a method for operating software configured for Internet access remote from a user computer, in accordance with one aspect of the invention.

FIG. 9 illustrates another embodiment of a method 900 for operating software configured for Internet access remote from a user computer in accordance with one aspect of the invention. Method 900 begins at 910 and continues at step 920, opening a virtual machine. In one embodiment, step 920 is implemented as in step 620.

User preferences are received at the virtual machine at step 930. In one embodiment, step 930 is implemented as in step 630. Software configured for Internet access request is received at step 940 and a web page is requested at step 950. In one embodiment, step 940 is implemented as in step 640. In one embodiment, step 950 is implemented as in step 650. A software configured for Internet access shutdown command is received at step 960, and based on the shutdown command, user preferences are sent to the user computer from the virtual machine at step 970. In one embodiment, step 960 is implemented as in step 660. In one embodiment, step 970 is implemented as in step 670.

Figure 10:
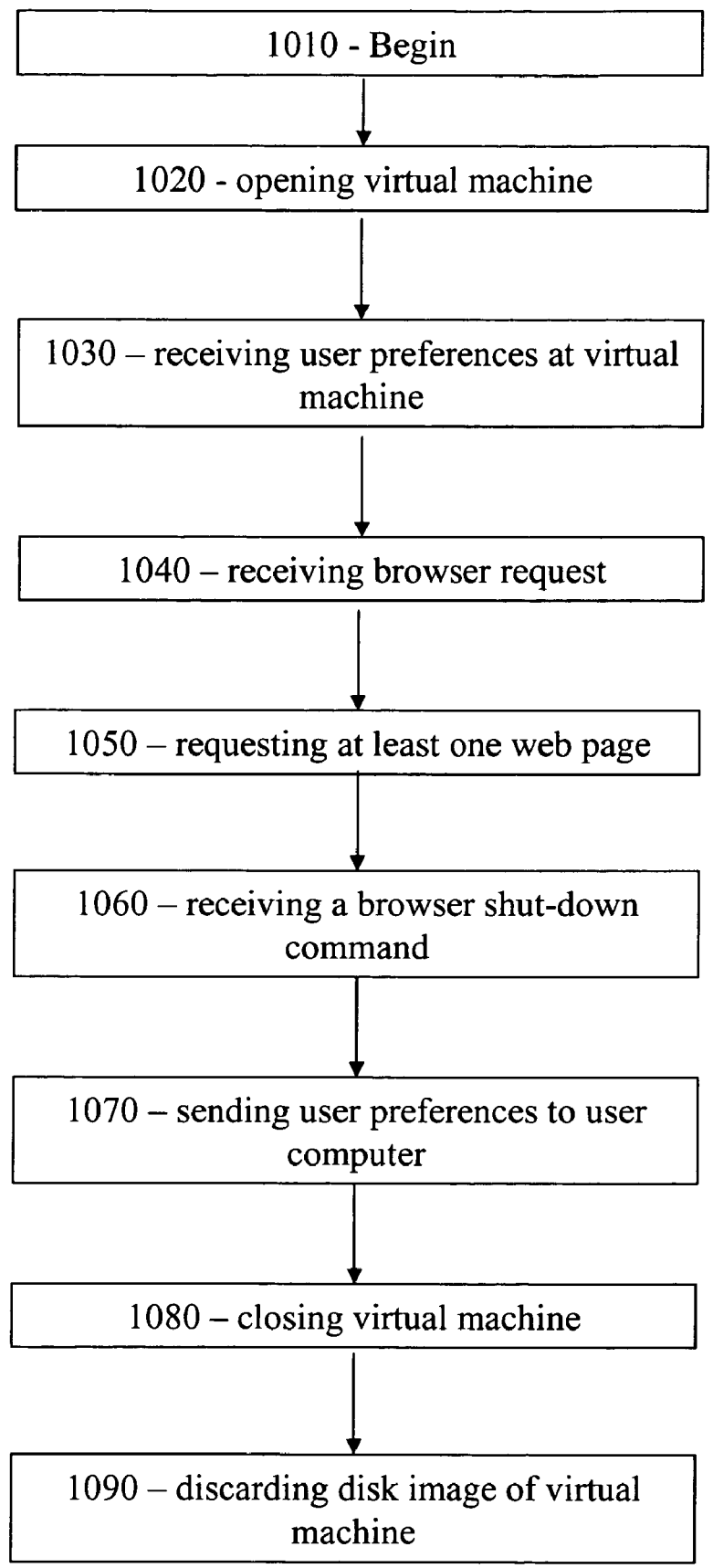
FIG. 10 illustrates another embodiment of a method for operating software configured for Internet access remote from a user computer, in accordance with one aspect of the invention.

The virtual machine is closed at step 980. Closing the virtual machine is based on software configured for Internet access shutdown. The software configured for Internet access shutdown can result from either a user request to close the application, or in one embodiment, software or hardware malfunction, requiring termination of the software configured for Internet access application thread. FIG. 10 illustrates a method for operating software configured for Internet access on a remote computer featuring one embodiment of a method for closing the virtual machine.

FIG. 10 illustrates another embodiment of a method 1000 for operating software configured for Internet access remote from a user computer in accordance with one aspect of the invention. Method 1000 begins at 1010 and continues at step 1020, opening a virtual machine. In one embodiment, step 1020 is implemented as in step 620.

User preferences are received at the virtual machine at step 1030. In one embodiment, step 1030 is implemented as in step 630. A request is received at step 1040 and a web page is requested at step 1050. In one embodiment, step 1040 is implemented as in step 640. In one embodiment, step 1050 is implemented as in step 650. A software configured for Internet access shutdown command is received at step 1060, and based on the shutdown command, user preferences are sent to the user computer from the virtual machine at step 1070. In one embodiment, step 1060 is implemented as in step 660. In one embodiment, step 1070 is implemented as in step 670.

The virtual machine is closed, based on software configured for Internet access shutdown command, at step 1080. In one embodiment, step 1080 is implemented as in step 980. Based on closing the virtual machine, the disk image of the virtual machine is discarded at step 1090. In one embodiment, step 1090 is implemented as in step 560.

Figure 11:
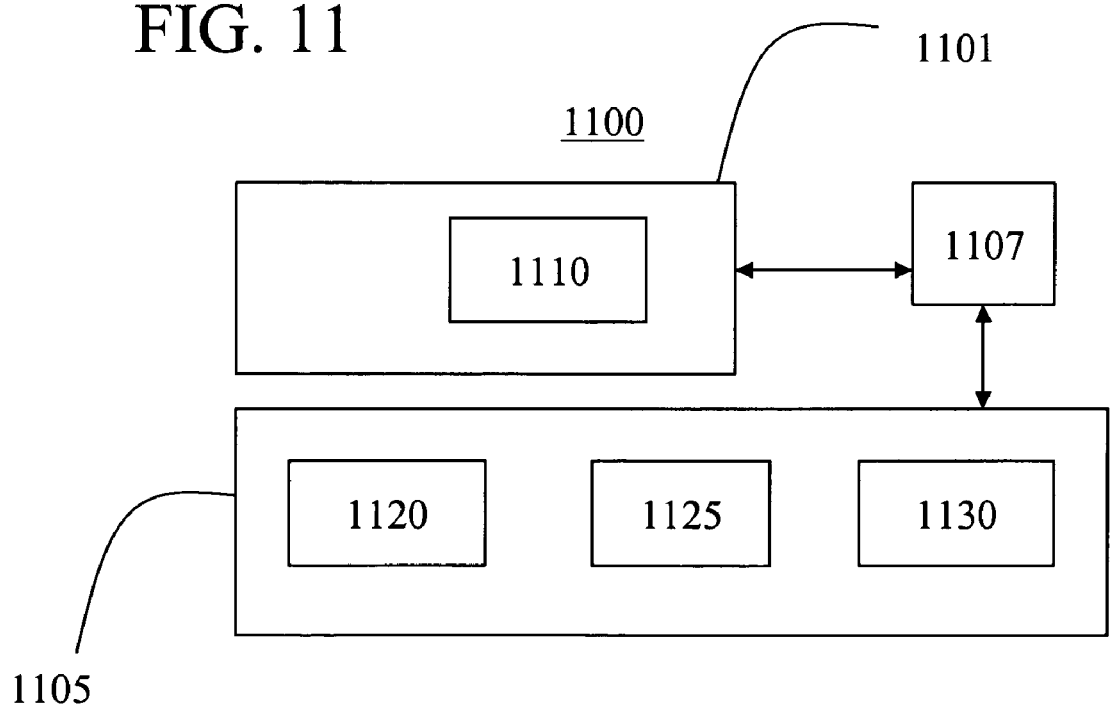
FIG. 11 illustrates one embodiment of a system for operating software configured for Internet access, in accordance with one aspect of the invention.

FIG. 11 illustrates one embodiment of a system 1100 for operating software configured for Internet access remote from a user computer in accordance with one aspect of the invention. System 1100 includes user computer 1101 and remote computer 1105 in electronic communication with each other via a network 1107. User computer and remote computer may run any appropriate operating system, including but not limited to a Windows-based operating system, UNIX, LINUX, AIX, Macintosh OS, SunOS, PalmOS, or the like. The computer may be any personal computer, such as an IBM or IBM-compatible PC, Macintosh computer, personal digital assistant, game console, server station, workstation, or any such similar computer device or system. Network 1107 can operate using any appropriate network protocol, including but not limited to an Internet Protocol, X11, VNC, or the like.

User computer 1101 includes user preferences 1110. Remote computer includes virtual machine 1120, copied user preferences 1125, and in one embodiment, modified user preferences 1130.

In one embodiment, operation of a virtual machine on a remote computer allows the remote computer to operate multiple virtual machines simultaneously such that the remote computer is operating multiple software configured for Internet access threads simultaneously. In such an embodiment, opening and closing each virtual machine results in a functional reboot on a clean disk image for each execution of software configured for Internet access application thread.

It should be noted that both the user computer and remote computer can reside behind a firewall, or on a protected node of a private network or LAN connected to a public network such as the Internet. Alternatively, the user computer and remote computer can be on opposite sides of a firewall, or connected with a public network such as the Internet. The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device), or a propagation medium such as a carrier wave. Examples of a computer-readable medium include a semiconductor or solid state memory, magnetic tape, a removable computer diskette, a random access memory (RAM), a read-only memory (ROM), a rigid magnetic disk and an optical disk.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

I claim:

1. A method of operating software configured for Internet access on a remote computer comprising:
    sending a request to open a virtual machine on a remote computer from a user computer;
    sending user preferences from the user computer to the virtual machine;
    sending an access request to the virtual machine to operate the software configured for Internet access; and
    the user computer receiving the user preferences from the virtual machine upon shutdown of the virtual machine.

2. The method of claim 1 wherein the user preferences relate to Internet access and are received based on a determination that operation of the software configured for Internet access has modified the user preferences.

3. The method of claim 1 wherein the user preferences comprise at least one member selected from the group consisting of user configuration settings, cookies and bookmarks.

4. The method of claim 1 wherein opening the virtual machine comprises creating a clean disk image.

5. The method of claim 1 further comprising closing the virtual machine based on the shutdown.

6. The method of claim 5 further comprising discarding a disk image of the virtual machine.

7. The method of claim 1 wherein sending user preferences from the user computer to the virtual machine comprises using a protocol selected from the group consisting of X11 and VNC.

8. A computer program product in a non-transitory computer readable medium for operating software configured for Internet access remote from a user computer comprising:
    instructions to open a virtual machine on a remote computer;
    instructions to receive user preferences at the virtual machine from the user computer;
    instructions to receive a request to operate the software configured for Internet access from the user computer at the remote computer;
    instructions to request at least one web page from the virtual machine; and
    instructions to send the user preferences to the user computer from the virtual machine upon shutdown of the virtual machine.

9. The product of claim 8 further comprising instructions to receive a shutdown command at the virtual machine from the user computer and wherein the instructions to send the user preferences to the user computer comprise instructions to send the user preferences in response to the received shutdown command.

10. The product of claim 8 wherein the instructions to send the user preferences to the user computer comprise:
    instructions to determine whether the received user preferences have been modified, and wherein the user preferences are sent based on the determination.

11. The product of claim 8 wherein the virtual machine is opened in response to a software configured for Internet access request.

12. The product of claim 8 wherein the instructions to open a virtual machine on a remote computer comprise instructions to create a clean disk image.

13. The product of claim 8 wherein the user preferences comprise at least one member selected from the group consisting of user configuration settings, cookies and bookmarks.

14. The product of claim 8 wherein the instructions to send the user preferences to the user computer comprise instructions to use a protocol selected from the group consisting of X11 and VNC.

15. The product of claim 8 further comprising:
instructions to close the virtual machine.

16. The product of claim 15 further comprising:
instructions to discard a disk image of the virtual machine.

17. A system for operating software configured for Internet access on a remote computer comprising:
a data processor, a memory and a non-transitory storage medium, wherein the non-transitory storage medium comprises program code executable by the data processor using the memory to perform steps of:
opening a virtual machine on a remote computer from a user computer;
sending user preferences from the user computer to the virtual machine;
sending a request to the virtual machine to operate the software configured for Internet access; and
the user computer receiving the user preferences from the virtual machine upon shutdown of the virtual machine.

18. The system of claim 17 wherein the user preferences are associated with a browser and comprise at least one member selected from a group consisting of cookies and bookmarks, and wherein the user preferences are received based on a determination that operation of software configured for Internet access and running on the virtual machine has modified the user preferences sent to the virtual machine.

19. The system of claim 18 wherein opening the virtual machine comprises creating a clean disk image to form a disk image of the virtual machine, and wherein the virtual machine is closed and the disk image of the virtual machine is discarded based on the shutdown.

* * * * *